United States Patent
Goodman et al.

(10) Patent No.: US 6,961,867 B2
(45) Date of Patent: Nov. 1, 2005

(54) APPARATUS AND METHOD TO PROVIDE DATA STORAGE DEVICE FAILOVER CAPABILITY

(75) Inventors: Brian Gerard Goodman, Tucson, AZ (US); Leonard George Jesionowski, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 331 days.

(21) Appl. No.: 10/136,696

(22) Filed: May 1, 2002

(65) Prior Publication Data

US 2003/0208703 A1    Nov. 6, 2003

(51) Int. Cl.[7] .............................................. G06F 11/00
(52) U.S. Cl. .......................................... 714/5; 714/13
(58) Field of Search ..................... 714/5, 6–13, 42–43; 710/13, 301, 302, 303

(56) References Cited

U.S. PATENT DOCUMENTS 5,790,775 A * 8/1998 Marks et al. .................. 714/9
6,574,753 B1 * 6/2003 Haynes et al. ................ 714/43
2003/0041283 A1 * 2/2003 Murphy et al. ............... 714/13
2003/0126315 A1 * 7/2003 Tan et al. ....................... 710/1

OTHER PUBLICATIONS

IBM, DFSMS/MVS Version 1 Release 4, GC26-4900-05, General Information, 1997, pp. 1-167.

* cited by examiner

Primary Examiner—Dieu-Minh Le
(74) Attorney, Agent, or Firm—Dale F. Regelman

(57) ABSTRACT

A method and apparatus to provide failover capability to a data storage and retrieval system in the event of a failure of a data storage drive, where that data storage and retrieval system includes one or more active data storage devices and one or more reserve data storage devices. In the event of a failure of an active data storage device, Applicants' data storage and retrieval system suspends all pending operations using that failed device, allocates a reserve data storage device to perform those suspended operations, and then resumes those suspended operations.

15 Claims, 7 Drawing Sheets

APPARATUS AND METHOD TO PROVIDE DATA STORAGE DEVICE FAILOVER CAPABILITY

FIELD OF THE INVENTION

Applicant's invention relates to an apparatus and method to provide data storage device failover capability to a data storage and retrieval system.

BACKGROUND OF THE INVENTION

Automated media storage libraries are known for providing cost effective access to large quantities of stored media. Generally, media storage libraries include a large number of storage slots on which are stored portable data storage media. The typical portable data storage media is a tape cartridge, an optical cartridge, a disk cartridge, electronic storage media, and the like. By electronic storage media, Applicants mean a device such as a PROM, EPROM, EEPROM, Flash PROM, compactflash, smartmedia, and the like.

One (or more) accessors typically accesses the data storage media from the storage slots and delivers the accessed media to a data storage device for reading and/or writing data on the accessed media. Suitable electronics operate the accessor(s) and operate the data storage device(s) to provide information to, and/or to receive information from, an attached on-line host computer system.

In a conventional automated media storage library, the storage slots are arranged in a planar orthogonal arrangement forming a "wall" of storage slots for holding data storage media. The plane may be a flat plane, or may be a cylindrical plane. To double the storage capacity, two "walls" of storage slots may be provided on either side of the accessor.

A number of different companies manufacture automated media storage libraries today, each model displaying various different features. One example is the IBM 3584 Media Storage Library. Some of the automated media storage libraries have dual or multiple accessors to provide a level of redundancy and to enhance performance.

SUMMARY OF THE INVENTION

Applicants' invention comprises a method and apparatus for transparent failover capability in the event of a failure of a data storage device disposed in a data storage and retrieval system. For failover protection, Applicants' data storage and retrieval system includes one or more active data storage devices and one or more reserve data storage devices. A library controller monitors the progress of each operation performed in the failover protected data storage and retrieval system. If an active data storage device should fail during an operation, all processes performing operations using that failed device are suspended, i.e. caused to "sleep." Thereafter, the allocated active data storage device is deallocated, and a reserve data storage device is allocated using the identity of the now-deallocated data storage device. The library controller then resumes, i.e. "awakens", each suspended process and each pending operation is retried.

BRIEF DESCRIPTION OF THE DRAWINGS

The invention will be better understood from a reading of the following detailed description taken in conjunction with the drawings in which like reference designators are used to designate like elements, and in which:

FIG. 1 is a perspective view of a first embodiment of Applicant's data storage and retrieval system;

FIG. 2 is a perspective view of a second embodiment of Applicant's data storage and retrieval system;

FIG. 3 is a block diagram showing the components of Applicants' data storage and retrieval system;

FIG. 4 is a schematic showing Applicant's distributed control network;

FIG. 5 is a flowchart summarizing certain steps in Applicant's method to provide failover protection;

FIG. 6 is a flowchart summarizing additional steps in Applicant's method to provide failover protection; and FIG. 7 is a flowchart summarizing certain initial steps in Applicants' method to provide failover protection.

DETAILED DESCRIPTION OF THE PREFERRED EMBODIMENTS

Referring to the illustrations, like numerals correspond to like parts depicted in the figures. The invention will be described as embodied in an automated data storage and retrieval subsystem for use in a data processing environment. The following description of Applicant's method to failover protection is not meant, however, to limit Applicant's invention to either data storage and retrieval systems, or to data processing applications, as the invention herein can be applied to data storage devices in general.

FIG. 3 illustrates the hardware and software environment in which preferred embodiments of the present invention are implemented. Host computer 390 includes, among other programs, a storage management program 310. In certain embodiments, host computer 390 comprises a single computer. In alternative embodiments, host computer 390 comprises one or more mainframe computers, one or more work stations, one or more personal computers, combinations thereof, and the like.

Information is transferred between the host computer 390 and secondary storage devices managed by a data storage and retrieval system, such as data storage and retrieval system 320, via communication links 350, 452, and 456. Communication links 350, 452, and 456, comprise a serial interconnection, such as an RS-232 cable or an RS-432 cable, an ethernet interconnection, a SCSI interconnection, a Fibre Channel interconnection, an ESCON interconnection, a FICON interconnection, a Local Area Network (LAN), a private Wide Area Network (WAN), a public wide area network, Storage Area Network (SAN), Transmission Control Protocol/Internet Protocol (TCP/IP), the Internet, and combinations thereof.

In the embodiment shown in FIG. 3, data storage and retrieval system 320 includes data storage devices 130 and 140. In alternative embodiments, Applicants' data storage and retrieval system 320 includes more than two data storage devices.

A plurality of portable data storage media 360 are moveably disposed within Applicants' data storage and retrieval system. In certain embodiments, the plurality of data storage media 360 are housed in a plurality of portable data storage cartridges 370. Each of such portable data storage cartridges may be removeably disposed in an appropriate data storage device.

Figure 1:
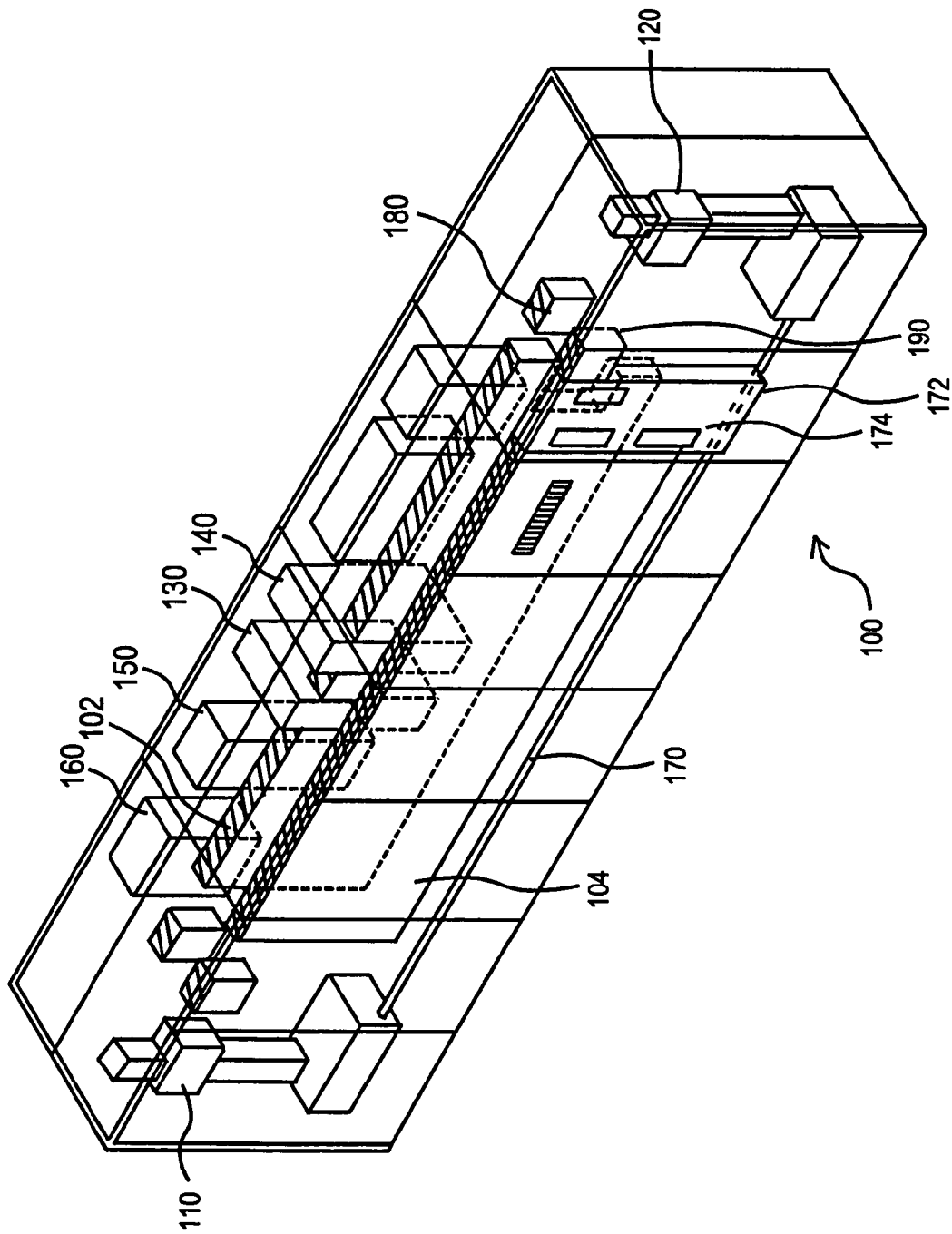

Data storage and retrieval system 320 further includes program logic to manage data storage devices 130 and 140, and plurality of portable data storage cartridges 370. In alternative embodiments, data storage and retrieval system 320 and host computer 390 may be collocated on a single apparatus. In this case, host computer 390 may be connected to another host computer to, for example, translate one set of library commands or protocols to another set of commands/ protocols, or to convert library commands from one communication interface to another, or for security, or for other reasons.

Host computer 390 comprises a computer system, such as a mainframe, personal computer, workstation, etc., including an operating system such as Windows, AIX, Unix, MVS, LINUX, etc. (Windows is a registered trademark of Microsoft Corporation; AIX is a registered trademark and MVS is a trademark of IBM Corporation; and UNIX is a registered trademark in the United States and other countries licensed exclusively through The Open Group.) The storage management program 310 in the host computer 390 may include the functionality of storage management type programs known in the art that manage the transfer of data to a data storage and retrieval system, such as the IBM DFSMS implemented in the IBM MVS operating system.

The IBM DFSMS software is described in "DFSMS/MVS V1R4 General Information," IBM document no. GC26-4900-05, published by IBM (Copyright 1997, IBM), which publication is incorporated herein by reference in its entirety. Storage management program 310 may include known storage management program functions, such as recall and migration. The storage management program 310 may be implemented within the operating system of the host computer 390 or as a separate, installed application program. Alternatively, storage management program 310 may include device drivers, backup software, and the like.

The data storage and retrieval system 320 comprises a computer system, and manages, for example, a plurality of tape drives and tape cartridges. In such tape drive embodiments, tape drives 130 and 140 may be any suitable tape drives known in the art, e.g., the Magstar 3590 tape drives (Magstar is a registered trademark of IBM Corporation). Similarly, tape cartridges 371 may be any suitable tape cartridge device known in the art, such as ECCST, Magstar, IBM 3420, 3480, 3490E, 3590 tape cartridges, etc.

Referring now to FIG. 1, automated data storage and retrieval system 100 is shown having a first wall of storage slots 102 and a second wall of storage slots 104. Portable data storage media are individually stored in these storage slots. In certain embodiments, such data storage media are individually housed in portable container, i.e. a cartridge. Examples of such data storage media include magnetic tapes, magnetic disks of various types, optical disks of various types, electronic storage media, and the like. References made herein to either a "data storage cartridge," or to a "data storage medium," include embodiments wherein the data storage medium is housed within a cartridge and also to embodiments wherein that data storage medium is not disposed in a housing.

Applicant's automated data storage and retrieval system includes one or more accessors, such as accessors 110 and 120. An accessor is a robotic device which accesses portable data storage media from first storage wall 102 or second storage wall 104, transports that accessed media to data storage devices 130/140 for reading and/or writing data thereon, and returns the media to a proper storage slot. As shown in FIG. 1, accessors 110 and 120 travel bi-directionally along rail 170 in an aisle disposed between first wall of storage slots 102 and second wall of storage slots 104.

Figure 3:
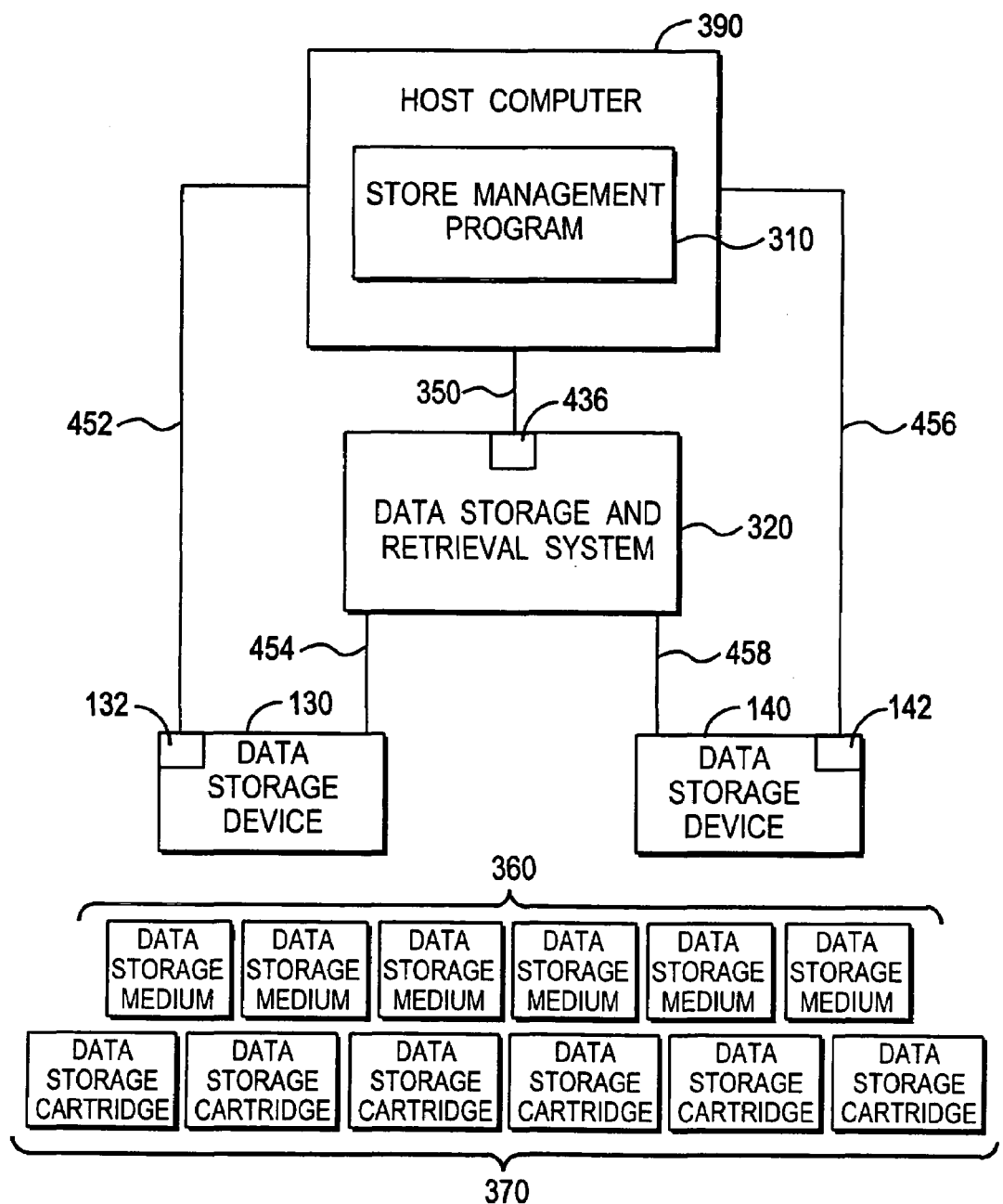
Figure 4:
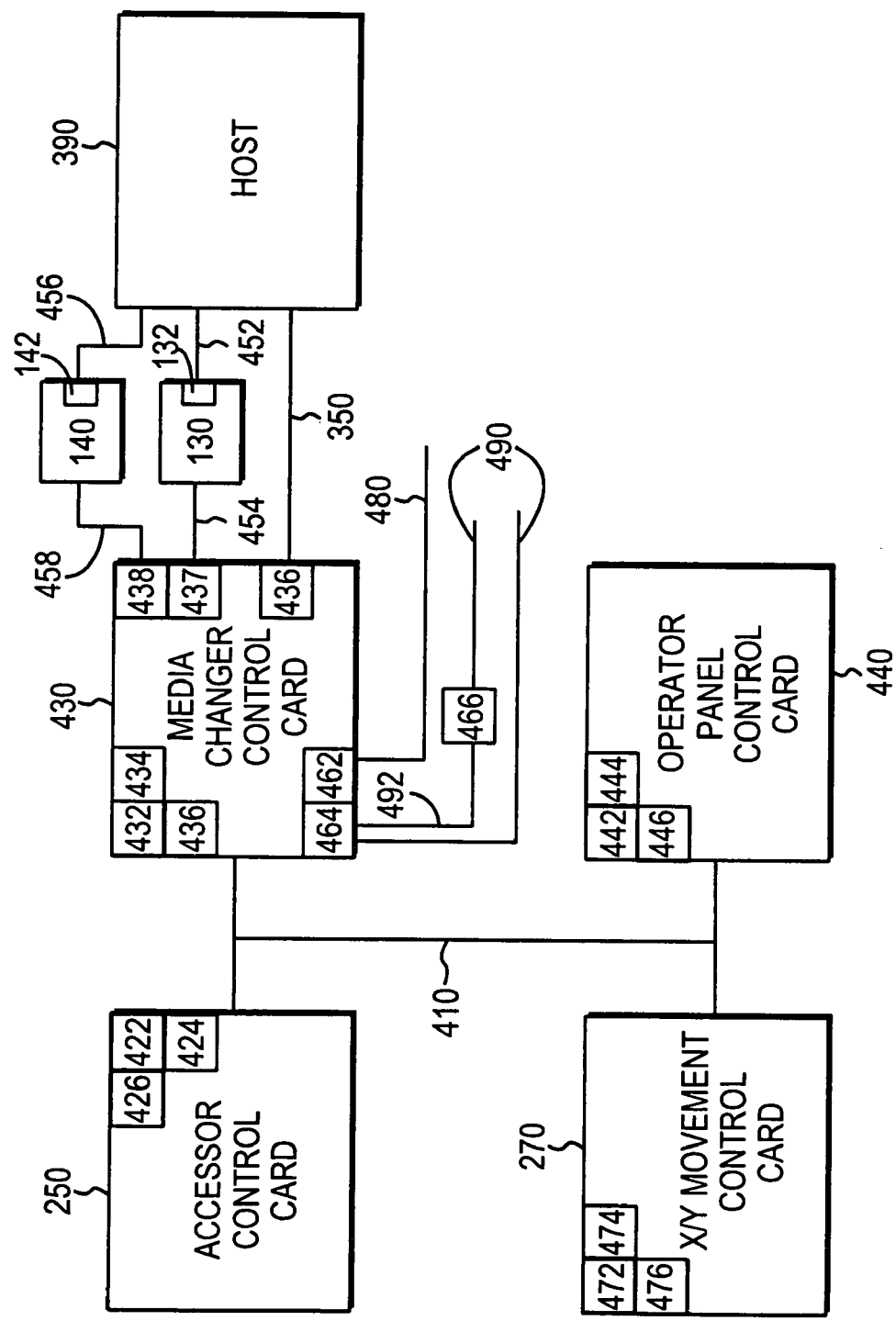

In certain embodiments, device 160 comprises a library controller. In certain of these embodiments, library controller 160 is integral with a computer. In other embodiments, Applicants' data storage and retrieval system utilizes a distributed control network. In these distributed control network embodiments, device 160 may comprise a motion card pack. Motion card pack 160 includes media changer control card 430 (FIG. 4). Media changer control card 430 communicates with host computer 390 (FIGS. 3, 4).

Referring again to FIG. 1, operator input station 150 permits a user to communicate with Applicant's automated data storage and retrieval system 100. Power component 180 and power component 190 each comprise one or more power supply units which supply power to the individual components disposed within Applicant's automated data storage and retrieval system. Import/export station 172 includes access door 174 pivotably attached to the side of system 100. Portable data storage cartridges can be placed in the system, or in the alternative, removed from the system, via station 172/access door 174.

Figure 2:
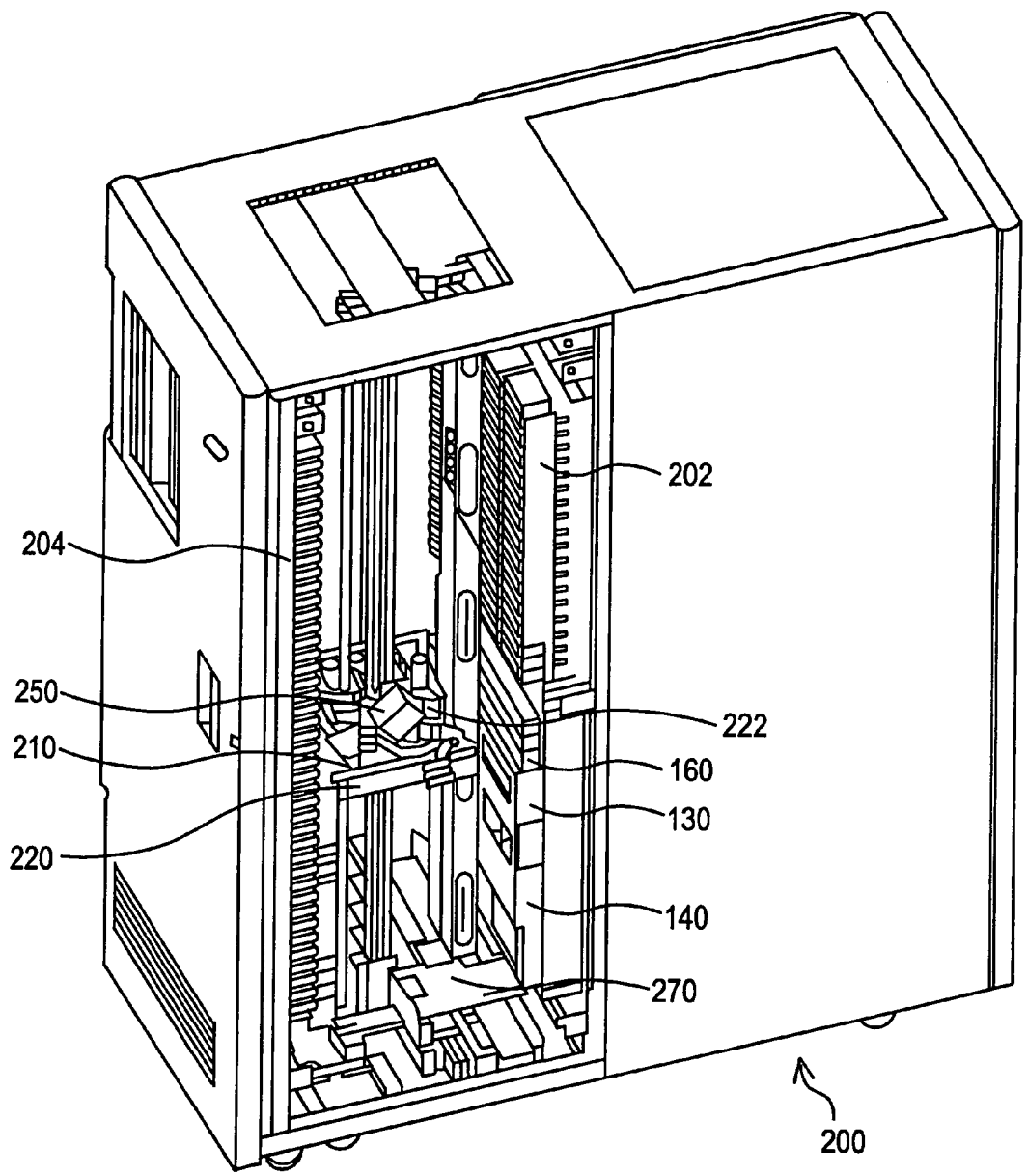

FIG. 2 shows system 200 which comprises another embodiment of Applicant's data storage and retrieval system. System 200 includes first storage wall 202 and second storage wall 204. Storage walls 202 and 204 each include a plurality of storage elements in which can be stored a plurality of portable data storage media. System 200 includes two or more data storage devices, such as devices 130 and 140. Data storage device 130/140 each comprise a floppy disk drive, an optical disk drive, a magnetic tape drive, an electronic media drive, and the like. System 200 further includes controller/motion card pack 160. System 200 further includes operator control panel 150 (not shown in FIG. 2).

System 200 further includes one or a plurality of portable data storage cartridges, such as cartridges 370 (FIG. 3), removeably disposed in one or more slots in storage walls 202/204. Each such cartridge contains a data storage medium, i.e. one of data storage media 360 (FIG. 3), internally disposed therein. Such data storage media includes optical media, magnetic media, tape media, electronic media, and combinations thereof.

System 200 also includes at least one robotic accessor 210 for transporting a designated portable data storage medium between a storage slot disposed in first wall 202 or second wall 204 and data storage device 130/140. Accessor 210 includes lifting servo section 220 on which is disposed at least one cartridge gripping mechanism 222 and, in certain embodiments, accessor control card 250. In certain embodiments, accessor 210 further includes X/Y movement control card 270.

FIG. 4 shows Applicant's distributed control network used in certain embodiments of data storage and retrieval systems 100 and 200. This distributed control system includes accessor control card 250 (FIGS. 2, 4), X/Y movement control card 270 (FIGS. 2, 4), operator panel control card 440 and media changer control card 430.

Communication bus 410 interconnects accessor control card 250, X/Y movement control card 270, operator panel control card 440 and media changer control card 430. In certain embodiments, bus 410 comprises an ethernet interconnection or a CANbus interconnection. Those skilled in the art will appreciate that CANbus technology was developed in the automotive industry, but now has gained wide acceptance in other industries.

In certain embodiments, accessor control card 250 is disposed on the lifting servo portion of accessor 110/120/ 210 (FIGS. 1, 2). In the embodiment shown in FIG. 4, accessor control card 250 includes microprocessor 422, non-volatile memory 424, and volatile memory 426. In certain distributed control network embodiments, accessor control card 250 (FIGS. 2, 4) serves as the library controller in Applicant's distributed control network.

Operator panel control card 440 is disposed within operator control panel 150 (FIG. 1). In the embodiment shown in FIG. 4, operator panel control card 440 includes microprocessor 442, nonvolatile memory 444, and volatile memory 446.

In certain embodiments, X/Y movement control card 270 is disposed on carriage portion of accessors 110 (FIG. 1), 120 (FIG. 1), 210 (FIG. 2). In the embodiment shown in FIG. 4, X/Y movement control card 270 includes microprocessor 472, nonvolatile memory 474, and volatile memory 476.

Media changer control card 430 is disposed within motion card pack 160 (FIGS. 1, 2). Media changer control card 430 includes microprocessor 432, nonvolatile memory 434, and volatile memory 436. In certain embodiments, media changer control card 430 includes network interface 462 which interconnects media changer control card 430 to one or more networks, such as network 480. In certain embodiments, network 480 comprises one or more local area networks, one or more private wide area networks, one or more public wide area networks, the internet, and combinations thereof.

In certain embodiments, media changer control card 430 includes device 464 which interconnects media changer control card 430 to one or more telephone systems, such as telephone system 490. In certain embodiments, device 464 comprises a modem. In these embodiments, modem 464 interconnects directly with telephone system 490. In alternative embodiments device 464 comprises a modem interface. In these embodiments, modem interface 464 interconnects via communication link 492 to modem 466. Modem 466 connects to telephone system 490. In certain embodiments, telephone system 490 comprises one or more private telephone systems, one or more public telephone systems, and combinations thereof.

Host computer 390 (FIGS. 3, 4) communicates with data storage device 130 (FIGS. 1, 2, 3, 4) via communication link 452 and host computer port 132 (FIGS. 3, 4). In certain embodiments, host computer port 132 is integral to device 130. Host computer 390 communicates with data storage device 140 (FIGS. 1, 2, 3, 4) via communication link 456 and host computer port 142 (FIGS. 3, 4). In certain embodiments, host computer port 142 is integral to device 140.

Data storage devices 130/140 communicate with media changer control card 430 via communication links 454/458 (FIGS. 3, 4) and interfaces 437/438 (FIG. 4), respectively. In certain embodiments, host computer 390 also communicates with media changer control card 430 (FIG. 4) via communication link 350 (FIGS. 3, 4) and host computer port 436 (FIGS. 3, 4). As those skilled in the art will appreciate, communication link 350 and host computer port 436 provide a control path into Applicant's distributed control network. Communication links 350, 452, 454, 456, and 458, are selected from the group comprising a serial interface, a local area network, a private wide area network, a public wide area network, a SCSI interface, a Fibre Channel interface, an ESCON interface, a FICON interface, and combinations thereof.

Applicants' data storage and retrieval system includes one or more "active" data storage devices, such as device 130 (FIGS. 1, 2, 3, 4). By "active" data storage device, Applicants mean a data storage device in communication with one or more host ports, such as host computer port 132 (FIGS. 3, 4). Applicants' data storage and retrieval system further includes one or more "reserve" data storage devices. By "reserve" data storage device, Applicants mean a data storage device that is not, initially at least, in communication with one or more host computer ports. The data storage devices comprising this plurality of reserve devices can be brought into communication with one or more host computer ports in the event one or more active data storage devices fail.

In certain embodiments, Applicants' data storage and retrieval system further includes one or more communication buses connected to the one or more host computer ports. Applicants' one or more communication buses include SCSI buses, Fibre Channel buses, Enterprise System Connection buses, FICON buses, local area networks, wide area networks, serial buses, and combinations thereof. In certain embodiments, Applicants' data storage and retrieval system includes a first communication bus and a second communication bus. In these embodiments, the first communication bus interconnects one or more of the first plurality of data storage devices, such as data storage device 130, with one or more host computer ports, and the second communication bus interconnects one or more of the second plurality of data storage devices, such as data storage device 140, with one or more host computer ports. In other embodiments, Applicants' first communication bus interconnects both one or more active data storage devices and one or more reserve data storage devices to one or more host computer ports.

Figure 7:
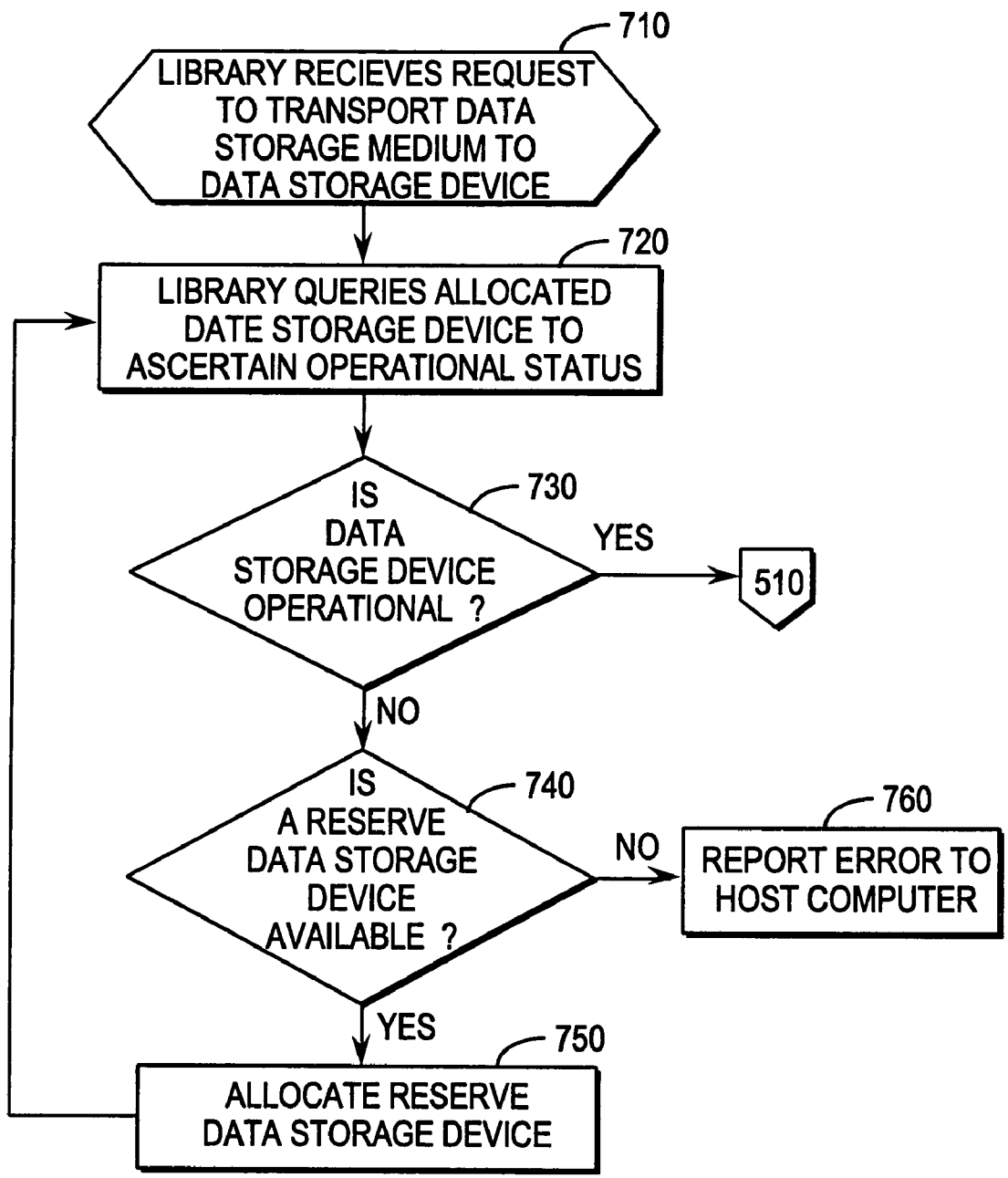

FIG. 7 summarizes the initial steps in Applicants' method to provide failover capability to Applicants' data storage and retrieval system. In step 710, Applicants' data storage and retrieval system, such as library 320 (FIG. 3), receives a request from a host computer, such as host computer 390 (FIG. 3), to transport a portable data storage medium, such as medium 360 (FIG. 3), to a data storage device, such as device 130 (FIGS. 1, 2, 3, 4). In step 720, the library queries the allocated data storage device to determine that device's operational status. If the allocated device reports an operational status in step 730, then Applicants' method transitions to step 510. Alternatively, if the allocated device reports a non-operational status in step 730, then Applicants' method transitions to step 740 wherein the library determines if a reserve data storage device is available.

If a reserve data storage device is available, then Applicants' method transitions to step 750 wherein a reserve data storage device is allocated to replace the original, non-operational data storage device. Applicants' method then transitions to step 720 wherein the newly-allocated data storage device is queried to determine its operational status. In the event the query of step 740 determines that no reserve data storage devices are available, then Applicants' method transitions to step 760 wherein an error is reported to the requesting host computer(s). Alternatively, Applicants' method could transition to step 510 where the error would be discovered and reported in a later operation.

Figure 5:
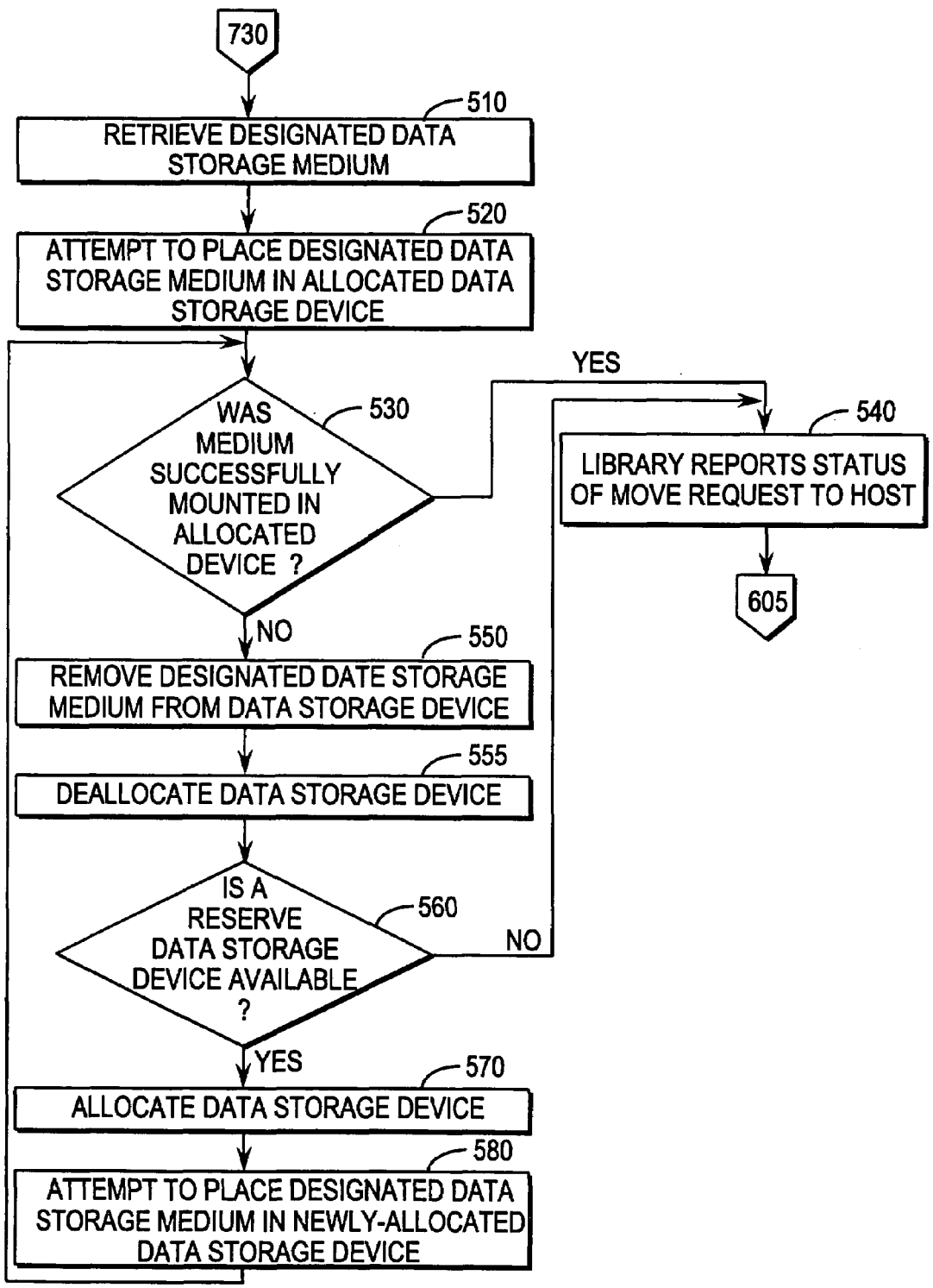

FIG. 5 summarizes additional steps in Applicants' method to provide failover capability to Applicants' data storage and retrieval system in the event of a failure of a drive operation, such as a failure to successfully load media into a data storage device. In step 510, the library retrieves a designated data storage medium to be moved.

In step 520, an attempt is made to mount the designated data storage medium in the allocated data storage device. In the event the mount is successful as indicated in step 530, then Applicants' method transitions to step 540 wherein the library reports the successful status of the move operation to the host.

On the other hand, if the data storage medium is not successfully mounted in the allocated data storage device, then Applicants' method transitions to step 550 wherein the mount operation is suspended and the designated medium is removed from the initially allocated data storage device. In step 555, the presently-allocated data storage device is deallocated. In certain embodiments of Applicants' method, deallocation step 555 includes discontinuing power to the first allocated data storage device. In certain embodiments, deallocation step 555 includes disconnecting the presently-allocated data storage device from Applicants' host communication bus. In certain embodiments, deallocation step 555 includes instructing the presently-allocated data storage device to disconnect from Applicants' host communication bus. In certain embodiments, deallocation step 555 includes instructing the presently-allocated data storage device not to respond on Applicants' host communication bus. These instructing steps are performed using, for example, communication links 454 (FIGS. 3, 4)/458 (FIGS. 3, 4).

In certain embodiments, once the failed data storage device has been deallocated, that now-inactive data storage device is placed in reserve status. Thus, if the attempted mount of step 525 failed because, for example, a small piece of debris prevented a successful mount, and if that debris was ejected from the device in step 550 when the data storage medium was removed, then a subsequent attempt to use that "failed" device might be successful.

In step 560, the library determines if a reserve data storage drive is available. In the event a reserve drive is available, then Applicants' method transitions to step 570. Alternatively, if a reserve drive is not available, then Applicants' method transitions to step 540 wherein the library reports an error to the requesting host computer(s).

In step 570, one of the reserve data storage devices, such as data storage device 140, is allocated. In certain embodiments, the allocation process of step 570 includes providing power to the reserve device. In certain embodiments, step 570 further includes connecting the reserve device to one or more host communication buses. In certain embodiments, step 570 includes instructing the reserve device to connect to one or more host communication buses. In certain embodiments, step 570 includes instructing the reserve device to communicate on Applicants' host communication bus. These instructing steps are performed using, for example, communication links 454 (FIGS. 3, 4)/458 (FIGS. 3, 4).

In certain embodiments of Applicants' method, the allocation process of step 570 includes an "identity swap" wherein the identity of the deallocated active data storage device is transferred to the allocated reserve device. Applicants' data storage and retrieval system includes communication links 454/458 between the library controller and the various data storage drives. Firmware disposed in the library controller uses these communication links to transfer the "identity" of the non-operational active data storage device to a reserve data storage device. In these embodiments, such an identity swap includes transferring a device identifier and/or a device address.

In step 580, the suspended mount operation is resumed and an attempt is made to mount the designated data storage medium in the newly-allocated reserve data storage device. Applicants' method then transitions to step 530.

Figure 6:
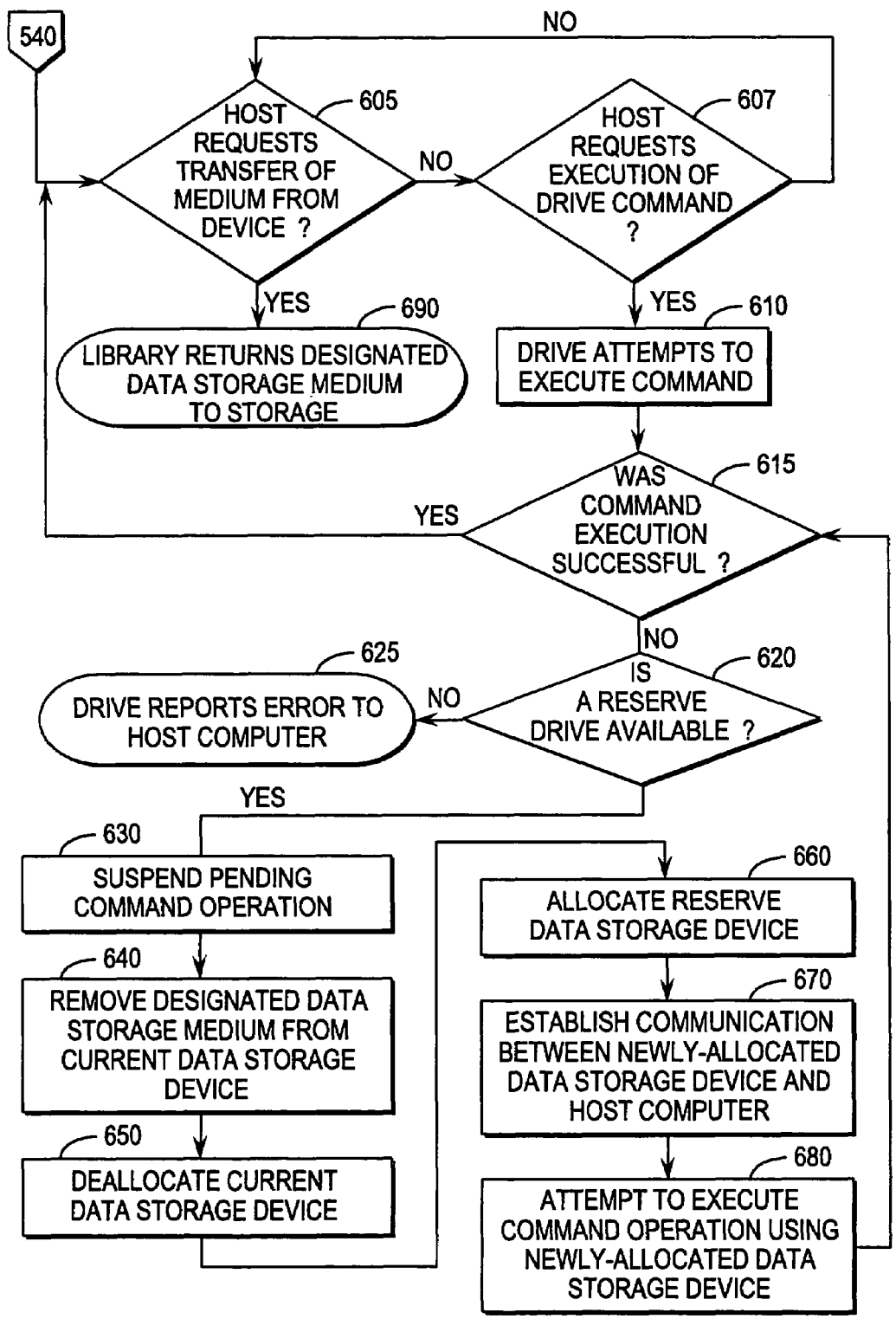

FIG. 6 summarizes additional steps in Applicants' method to provide failover capability to Applicants' data storage and retrieval system in the event of a failure of a data storage device. By "failure" of a data storage device, Applicants mean less than optimal performance of that data storage device. After the designated data storage medium has been successfully mounted in a data storage device, Applicants' method then transitions to step 605 wherein the library controller determines whether the host requests transfer of the data storage medium from the device to storage. If the host requests such a transfer, Applicants' method transitions to step 690 wherein the data storage medium is returned to storage. If the library determines in step 605 that the host does not request a return of the data storage medium to storage, then in step 607 the library ascertains if the host requests execution of a drive operation. If the library determines by monitoring host/library interface 350 (FIG. 3), or host/drive interfaces 454 (FIGS. 3, 4)/458 (FIGS. 3, 4) that the host requests neither a return to storage or execution of a drive operation, then Applicants' method transitions to step 605. Thereafter, the library continues to monitor interfaces 350/454/458 to ascertain subsequent host requests.

Alternatively, if the library determines in step 607 that the host requests execution of a drive operation, such as a read operation, a write operation, a locate operation, a rewind operation, or the like, then in step 610 an attempt is made by the data storage drive to execute that requested drive operation. In the event the requested drive operation is successful as determined in step 615, then Applicants' method transitions to step 605 and the library again monitors interfaces 350/454/458 for subsequent host requests. In certain embodiments, the library controller monitors the data storage device, and determines in step 615 if the requested drive operation was successfully executed. In certain embodiments, the data drive in step 615 reports to the library controller whether the requested drive operation was successfully executed. In certain embodiments step 615 includes monitoring by the library controller in combination with reporting by the data storage device.

In the event it is determined in step 615 that the attempted drive operation of step 610 was not successful, Applicants' method transitions to step 620 wherein the library controller determines if a reserve data storage drive is available. In the event a reserve drive is available, then Applicants' method transitions to step 630. On the other hand, if a reserve drive is not available, then Applicants' method transitions to step 625 and an error is reported by the data storage device to the host computer in response to the request of step 607.

In step 630 the pending drive operation is suspended. Thereafter, in step 640 the designated medium is removed from the presently-allocated data storage device. In step 650, that presently-allocated data storage device is deallocated. In certain embodiments of Applicants' method, deallocation step 650 includes discontinuing power to the presently-allocated data storage device. In certain embodiments, deallocation step 650 includes disconnecting the presently-allocated data storage device from Applicants' host communication bus. In certain embodiments, deallocation step 650 includes instructing the presently-allocated data storage device to disconnect from Applicants' host communication bus. In certain embodiments, deallocation step 650 includes instructing the presently-allocated data storage device to not communicate on Applicants' host communication bus. These instructing steps are performed using, for example, communication links 454 (FIGS. 3, 4)/458 (FIGS. 3, 4).

In certain embodiments, once the failed data storage device has been deallocated, that now-inactive data storage device is placed in reserve status. Thus, if the attempted drive operation of step 610 failed because, for example, a small piece of debris prevented a successful operation, and if that debris was ejected from the device in step 640 when the data storage medium was removed, then a subsequent attempt to use that "failed" device might be successful.

In step 660, one of the reserve data storage devices, such as data storage device 140, is allocated to perform the requested drive operation. In certain embodiments, the allocation process of step 660 includes providing power to the reserve device. In certain embodiments, step 660 includes connecting the reserve device to one or more host communication buses. In certain embodiments, step 660 includes instructing the reserve device to connect to one or more host communication buses. In certain embodiments, step 660 includes instructing the reserve device to communicate on one or more Applicants' host communication buses. These instructing steps are performed using, for example, communication links 454 (FIGS. 3, 4)/458 (FIGS. 3, 4).

In step 670 communication is established with the newly-allocated data storage device. In certain embodiments, this establishing communication step includes an "identity swap" wherein the identity of the deallocated data storage device is transferred to the allocated reserve device. In certain embodiments, such an identity swap includes transferring a device identifier, a device address, and the like. In certain embodiments, the "identity swap" procedure of step 670 includes providing information to the newly-allocated data storage device about the status of the requested drive operation previously attempted by the failed device in step 610.

In step 680, the suspended drive operation is resumed using the newly-allocated reserve data storage device. If that resumed drive operation is successful as determined in step 615, then Applicants' method transitions to step 605. If, however, the drive operation of step 680 is not successful, then Applicants' method transitions to step 620.

Applicants' invention includes a data storage and retrieval system comprising a computer useable medium having computer readable program code disposed therein for implementing Applicants' method to provide failover protection in the event of a failure of one or more data storage devices. Applicants' invention further includes computer program products embodied as program code stored in one or more memory devices, such as a magnetic disk, a magnetic tape, or other non-volatile memory device disposed in Applicants' data storage device. The embodiments of Applicants' method recited in FIGS. 5, 6, and/or 7, may be implemented separately. For example, one embodiment may include only the steps of FIG. 5. Another embodiment may utilize the steps of FIGS. 6 and 7. Moreover, in certain embodiments, individual steps may be combined, eliminated, or reordered. For example, step 607 may be performed by the drive with no involvement from the library. In addition, steps 615 and 620 may be performed by a data storage device. The library may inform the data storage device as to any available reserve devices, and the data storage device may report the error in step 625 in the event there are no reserve devices available.

While the preferred embodiments of the present invention have been illustrated in detail, it should be apparent that modifications and adaptations to those embodiments may occur to one skilled in the art without departing from the scope of the present invention as set forth in the following claims.

We claim:

1. A method to provide failover capability to a data storage and retrieval system in communication with a host computer, wherein said data storage and retrieval system comprises a plurality of data storage media moveably disposed therein, one or a plurality of host computer ports, wherein said one or a plurality of host computer ports are connected to a communication bus, one or a plurality of first data storage devices capable of reading information from and writing information to each of said data storage media, wherein each of said one or a plurality of first data storage devices is in communication with one or more of said one or a plurality of host computer ports, one or a plurality of second data storage devices capable of reading information from and writing information to each of said data storage media, wherein each of said one or a plurality of second data storage devices is not in communication with one or more of said one or a plurality of host computer ports, said method comprising the steps of:

receiving by said data storage and retrieval system a drive operation from a host computer;

querying by said data storage and retrieval system an allocated first data device comprising one of said plurality of first data storage devices for its operational status;

operative if said allocated first data device reports a non-operational status, determining by said data storage and retrieval system if a second data device comprising one of said plurality of second data storage devices is available;

operative if a second data device is not available, reporting an error to said host by said data storage and retrieval system;

operative if said allocated first data device reports an operational status, executing said drive command operation;

suspending said drive command operation in the event of a failure of said first data storage device;

deallocating said first data storage device;

disconnecting said first data storage device from said communication bus;

allocating a second data storage device to execute said drive command operation, wherein said second data storage device comprises one of said one or a plurality of second data storage devices;

connecting said second data storage device to said communication bus; and resuming said drive command operation.

2. The method of claim 1, further comprising the step of providing power to said second data storage device.

3. The method of claim 1, wherein said first data storage device comprises a device identifier, further comprising the step of transferring said device identifier to said second data storage device.

4. The method of claim 1, wherein said first data storage device comprises a device address, further comprising the step of transferring said device address to said data storage device.

5. The method of claim 1, wherein said drive operation is selected from the group consisting of a mount operation, a write operation, and a read operation.

6. A data storage and retrieval system in communication with a host computer comprising a computer useable medium having computer readable program code disposed therein for providing failover capability, wherein said data storage and retrieval system comprises a plurality of data storage media moveably disposed therein, one or a plurality of host computer ports, one or a plurality of first data storage devices capable of reading information from and writing information to each of said data storage media, wherein each of said one or a plurality of first data storage devices is in communication with one or more of said one or a plurality of host computer ports, one or a plurality of second data storage devices capable of reading information from and writing information to each of said data storage media, wherein each of said one or a plurality of second data storage devices is not in communication with one or more of said one or a plurality of host computer ports, wherein said one or a plurality of host computer ports are connected to a communication bus, and wherein said one or plurality of first data storage devices are connected to said communication bus, the computer readable program code comprising a series of computer readable program steps to effect:

allocating a first data storage device to execute a drive command operation, wherein said first data storage device comprises one of said one or a plurality of first data storage devices;

executing said drive command operation;

suspending said drive command operation in the event of a failure of said first data storage device;

deallocating said first data storage device;

disconnecting said first data storage device from said communication bus;

allocating a second data storage device to perform said drive command operation, wherein said second data storage device comprises one of said one or a plurality of second data storage devices;

connecting said second data storage device to said communication bus; and resuming said drive command operation.

7. The data storage and retrieval system of claim 6, wherein said computer readable program code further comprises a series of computer readable program steps to effect discontinuing power to said first data storage device.

8. The data storage and retrieval system of claim 6, wherein said computer readable program code further comprises a series of computer readable program steps to effect providing power to said second data storage device.

9. The data storage and retrieval system of claim 6, wherein said computer readable program code further comprises a series of computer readable program steps to effect querying said first data storage device to determine the operational status of that first data storage device.

10. The data storage and retrieval system of claim 6, wherein said first data storage device comprises a device identifier, wherein said computer readable program code further comprises a series of computer readable program steps to effect transferring said device identifier to said second data storage device.

11. The data storage and retrieval system of claim 6, wherein said first data storage device comprises a device address, wherein said computer readable program code further comprises a series of computer readable program steps to effect transferring said device address to said second data storage device.

12. The data storage and retrieval system of claim 6, wherein said drive operation is selected from the group consisting of a mount operation, a write operation, and a read operation.

13. A data storage and retrieval system in communication with a host computer comprising a computer useable medium having computer readable program code disposed therein for providing failover capability, wherein said data storage and retrieval system comprises a plurality of data storage media moveably disposed therein, one or a plurality of host computer ports, one or a plurality of first data storage devices, wherein each of said one or a plurality of first data storage devices is in communication with one or more of said one or a plurality of host computer ports, one or a plurality of second data storage devices, wherein each of said one or a plurality of second data storage devices is not in communication with one or more of said one or a plurality of host computer ports, the computer readable program code comprising a series of computer readable program steps to effect:

designating one of said plurality of data storage media;

allocating a first data storage device, wherein said first data storage device comprises one of said one or a plurality of first data storage devices;

executing a mount operation wherein said designated data storage medium is removeably disposed in said first data storage device;

suspending said mount operation in the event of a failure of said first data storage device;

deallocating said first data storage device;

allocating a second data storage device, wherein said second data storage device comprises one of said one or a plurality of second data storage devices; and resuming said mount operation.

14. A data storage and retrieval system in communication with a host computer comprising a computer useable medium having computer readable program code disposed therein for providing failover capability, wherein said data storage and retrieval system comprises a plurality of data storage media moveably disposed therein, one or a plurality of host computer ports, one or a plurality of first data storage devices, wherein each of said one or a plurality of first data storage devices is in communication with one or more of said one or a plurality of host computer ports, one or a plurality of second data storage devices, wherein each of said one or a plurality of second data storage devices is not in communication with one or more of said one or a plurality of host computer ports, the computer readable program code comprising a series of computer readable program steps to effect:

designating one of said plurality of data storage media;

providing designated information;

allocating a first data storage device, wherein said first data storage device comprises one of said one or a plurality of first data storage devices;

executing a write operation using said first data storage device wherein said designated information is written to said designated data storage medium;

suspending said write operation in the event of a failure of said first data storage device;

deallocating said first data storage device;

allocating a second data storage device, wherein said second data storage device comprises one of said one or a plurality of second data storage devices;

establishing communication between said second data storage device and one of said one or a plurality of host computer ports; and resuming said write operation.

15. A data storage and retrieval system in communication with a host computer comprising a computer useable medium having computer readable program code disposed therein for providing failover capability, wherein said data storage and retrieval system comprises a plurality of data storage media moveably disposed therein, one or a plurality of host computer ports, one or a plurality of first data storage devices, wherein each of said one or a plurality of first data storage devices is in communication with one or more of said one or a plurality of host computer ports, one or a plurality of second data storage devices, wherein each of said one or a plurality of second data storage devices is not in communication with one or more of said one or a plurality of host computer ports, the computer readable program code comprising a series of computer readable program steps to effect:

designating one of said plurality of data storage media, wherein said designated data storage medium includes designated information;

allocating a first data storage device, wherein said first data storage device comprises one of said one or a plurality of first data storage devices;

executing a read operation wherein said first data storage device reads designated information from said designated data storage medium;

suspending said read operation in the event of a failure of said first data storage device;

deallocating said first data storage device;

allocating a second data storage device, wherein said second data storage device comprises one of said one or a plurality of second data storage devices;

establishing communication between said second data storage device and one of said one or a plurality of host computer ports; and resuming said read operation.

* * * * *